Jan. 7, 1969     K. D. ODNEY     3,420,479
TREE SNAGGING PARACHUTE
Filed Dec. 14, 1967
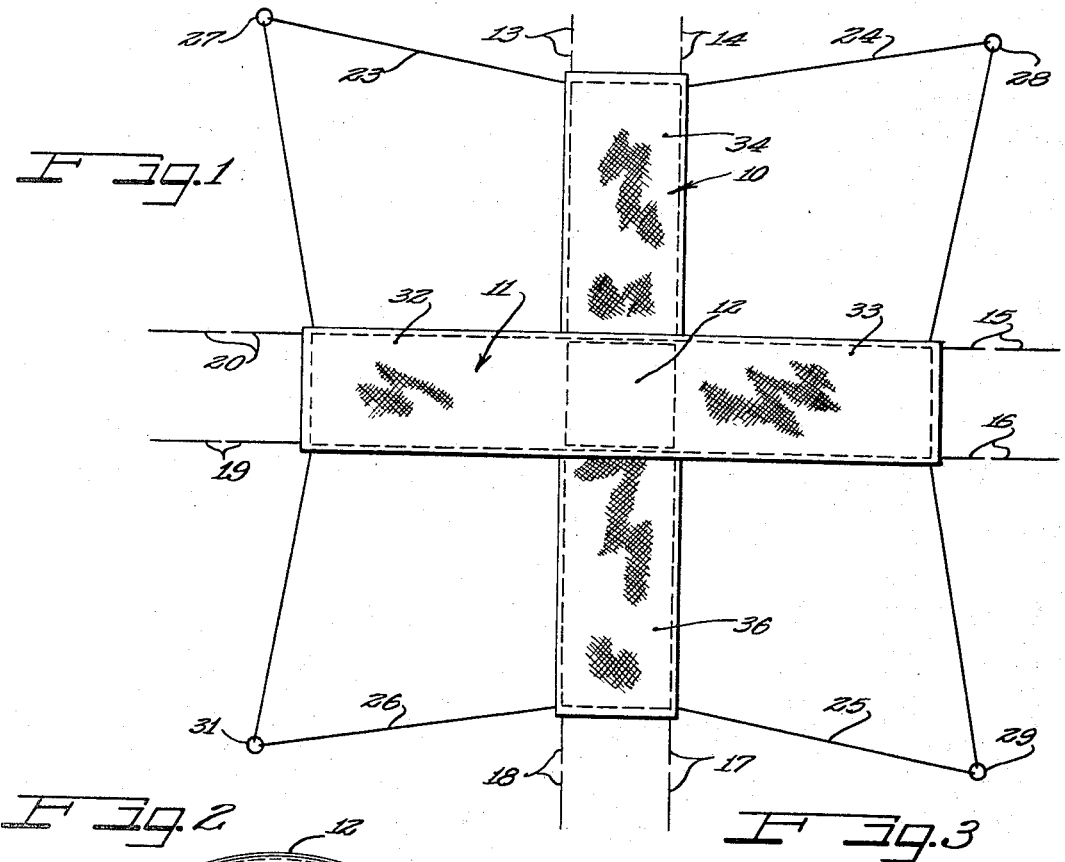
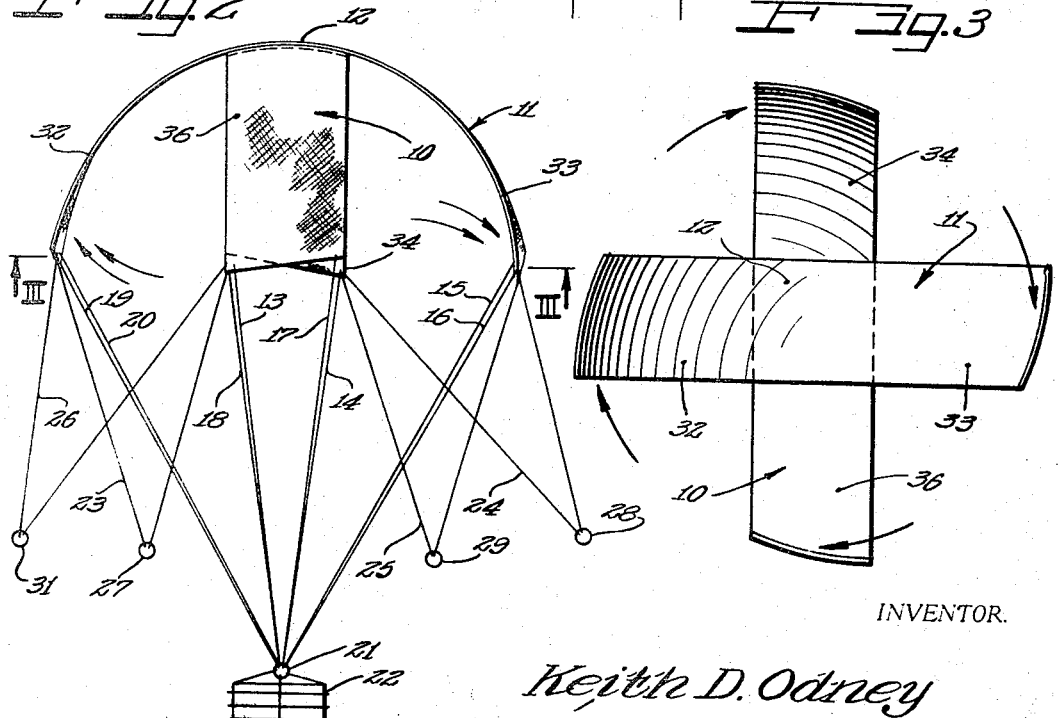
INVENTOR.
Keith D. Odney
ATTORNEYS

United States Patent Office 3,420,479
Patented Jan. 7, 1969

3,420,479
TREE SNAGGING PARACHUTE
Keith D. Odney, Sioux Falls, S. Dak., assignor to Raven Industries, Inc., Sioux Falls, S. Dak., a corporation of South Dakota
Filed Dec. 14, 1967, Ser. No. 690,641
U.S. Cl. 244—152                    11 Claims
Int. Cl. B64d 17/14; B64d 17/18; B64d 17/24

ABSTRACT OF THE DISCLOSURE

A parachute which carries flying lines with weights that are slung out due to rotation of the parachute to catch in trees or other items so as to be easily visible on the ground.

BACKGROUND OF THE INVENTION

*Field of the invention.*—This invention relates to parachutes and in particular to a parachute which has flying lines with weights mounted on them and which has shroud lines of different lengths so that the parachute rotates to swing out the weights and the flying lines.

BRIEF SUMMARY OF THE INVENTION

It is desirable at times to mark ground locations so that they are visible from the air. For example, sometimes marker transmitters are dropped from aircraft and it is necessary to visually locate the ground location of the transmitter for various purposes. The present invention comprises a rotating parachute with flying lines attached to it with weights attached to the flying lines so that they are moved by cenrifugal force to snag trees or other items so that the parachute may be easily visible from the air.

It is an object thereto, to provide a parachute which is easily visible from the air.

Another object is to provide a parachute with panels that cause it to rotate and formed with weighted flying lines capable of catching trees or other items to be easily visible from the air.

Further objects, advantages and features of this invention will become apparent from the following description and claims when read in view of the drawings, in which:

BRIEF DESCRIPTION OF THE DRAWINGS

FIGURE 1 is a uninflated plan view of the parachute of this invention;
FIGURE 2 is a side view showing the parachute, and;
FIGURE 3 is a sectional plan view taken on line III—III of FIGURE 2.

DESCRIPTION OF THE PREFERRED EMBODIMENTS

The figures show a parachute comprising the main panels 10 and 11 of generally rectangular shape which are formed into a cross and sewed together at their overlapping portions 12. Panel 10 has two portions 34 and 36 and panel 11 has two portions 32 and 33.

Shroud lines 13, 14, 15, 16, 17, 18, 19 and 20 are attached to panels 10 and 11 along their edges or skirt portions and extend downwardly to a cargo ring 21. Cargo 22 may be attached to ring 21.

Alternate shroud lines 13, 15, 17 and 19 are shorter than shroud lines 14, 16, 18 and 20 in order to tip the panels to form air foils and unbalance the flow of air around the parachute and impart a rotational force to the canopy. For a given descent rate, the rate of rotation increases as the difference in length of adjacent shroud lines increases. However, if the difference in length becomes too great, the canopy will not remain inflated. Thus, the difference in shroud lines is not great enough to cause that to happen.

Flying lines 23, 24, 25 and 26 are attached to panels 10 and 11, as shown in the plan view of FIGURE 1, and weights such as lead shot 27, 28, 29 and 31 are fastened at the center of the flying lines. Flying line 23 has one end attached to the corner of panel 32 and the other end to the corner of panel 34. Flying line 24 has one end attached to the corner of panel 34 and the other end to the corner of panel 33. Flying line 25 has one end attached to a corner of panel 33 and the other end attached to the corner of panel 36. Flying line 26 has one end attached to the corner of panel 36 and the other end attached to the corner of panel 32.

The weights 27, 28, 29 and 31 may be lead shot which are formed with slots and may be attached to the lines 23, 24, 25 and 26 by placing the lines in the slots and crimping.

The panels 10 and 11 may be made of nylon cloth, acrylic coated, 1.1 oz. per yard square and may have a width to length ratio of about 5:1. The shroud and flying lines may be nylon, "superbraid," 50 pound tensile strength.

The shroud lines, flying lines and the panels may be sewed with nylon or dacron size E thread. The shroud and flying lines are bar tacked to the panels 10 and 11.

A particular parachute tested has panels 10 and 11 that are 9.25 inches long and 1.75 inches wide. The length of the flying lines may vary from 60% to 110% of the panel length.

In operation, a payload 22 is connected to ring 21 directly or with a swivel, (not shown) if desired. As the parachute is released it will start to rotate due to alternate lines 13–20 being shorter and weights 27, 28, 29 and 31 will start to move outwardly as shown in FIGURE 2. As the parachute continues to descend, the weights 27, 28, 29, and 31 will move further out than as shown in FIGURE 2 until they may become nearly straight out with lines 23, 24, 25 and 26 lying in the same plane. The angle at which they come to equilibrium depends on the weight of the load 22, the weight of weights 27, 28, 29, and 31, the length of flying lines 23, 24, 25, and 26 and the rate of rotation of the parachute (determined by the difference in the length of the shroud lines).

As the parachute descends the flying lines and weights allow the parachute to snag trees or other articles so that the parachute is spread out a great deal and may be easily seen from the air.

The rate of rotation causes deployment of the flying lines to a greater diameter than a parachute without flying lines. For example, the flying lines and weights may have a diameter which is 15% greater than the inflated plan view diameter of the parachute without flying lines. Thus, the parachute will snag a tree or other object easier than one without flying lines and will be more easily spotted from the air.

The flying lines and weights should rotate substantially in a plane horizontal to the path of descent. The panels of the parachute may be made of bright colors so that the chute may be easily located.

I claim:
1. A parachute having supporting panels and adapted to rotate when inflated:
shroud means attached to the supporting panels, and flying means comprising flexible material with weights mounted thereon attached to said parachute panels, said weights in the initially inflated condition hanging downwardly from the skirt portions a distance which is at least equal to 15% of the largest inflated plan view diameter of the parachute and which move upwardly as rotation starts until the weights travel in a path which has a diameter that is greater than the plan view diameter of the parachute.

2. Apparatus according to claim 1 wherein the supporting panels are formed from generally rectangular sections of resilient material and the rectangular sections are joined together, and the shroud means are attached to corners of the supporting panels.

3. Apparatus according to claim 2 wherein supporting means is formed at the lower end of the shroud means and alternate ones of the shroud means are shorter than the remaining shroud means.

4. Apparatus according to claim 3 wherein the shroud means are lines.

5. Apparatus according to claim 1 wherein each of the flying means has its ends attached to two of the supporting panels.

6. Apparatus according to claim 5 wherein the flexible material of the flying means comprises lines.

7. Apparatus according to claim 6 wherein the weights are attached to the lines in their middle portions between the supporting panels.

8. Apparatus according to claim 4 wherein the flying means are flying lines with opposite ends attached to adjacent supporting panels and weights attached to the flying means.

9. Apparatus according to claim 8 wherein the flying lines are attached to corners of the supporting panels.

10. Apparatus according to claim 9 wherein the weights are attached to the center portions of the flying lines.

11. Apparatus according to claim 10 wherein the lengths of the flying lines is such that the flying lines and the weights approach the horizontal plane as the parachute rotates during descent.

References Cited

UNITED STATES PATENTS

| 1,951,864 | 3/1934 | Driggs | 244—142 |
| 2,724,567 | 11/1955 | Adams | 244—145 |
| 3,118,641 | 1/1964 | Barish | 244—142 |
| 3,228,637 | 1/1966 | Gross | 244—152 |

FOREIGN PATENTS

| 742,587 | 12/1955 | Great Britain. |

MILTON BUCHLER, *Primary Examiner.*